Figure 1:
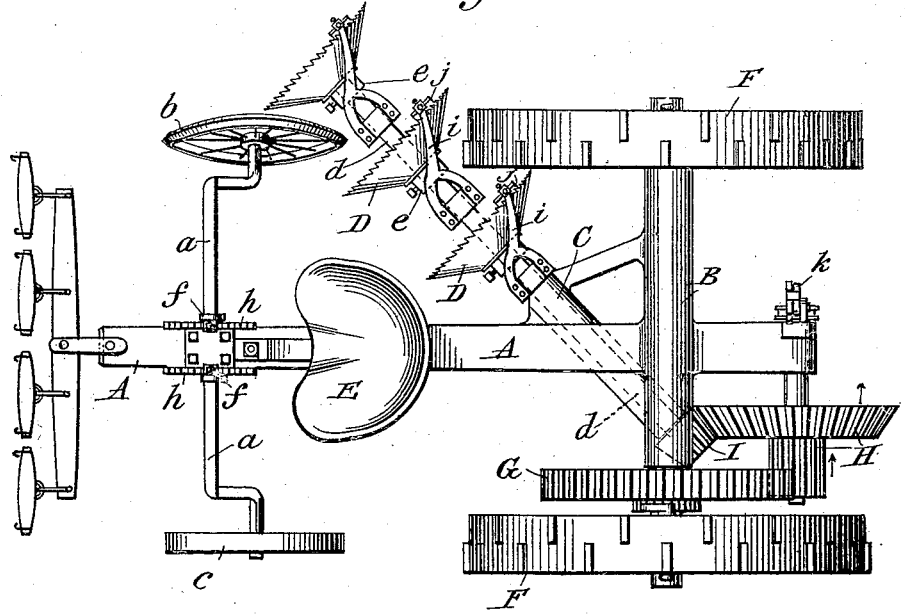

J. G. ROUNTREE.
ROOT CUTTING ATTACHMENT FOR PLOWING MACHINES.
APPLICATION FILED AUG. 27, 1907.

915,483.

Patented Mar. 16, 1909.

2 SHEETS—SHEET 1.

Witnesses:

Inventor:
Joseph Gustav Rountree

J. G. ROUNTREE.
ROOT CUTTING ATTACHMENT FOR PLOWING MACHINES.
APPLICATION FILED AUG. 27, 1907.
915,483.
Patented Mar. 16, 1909.
2 SHEETS—SHEET 2.
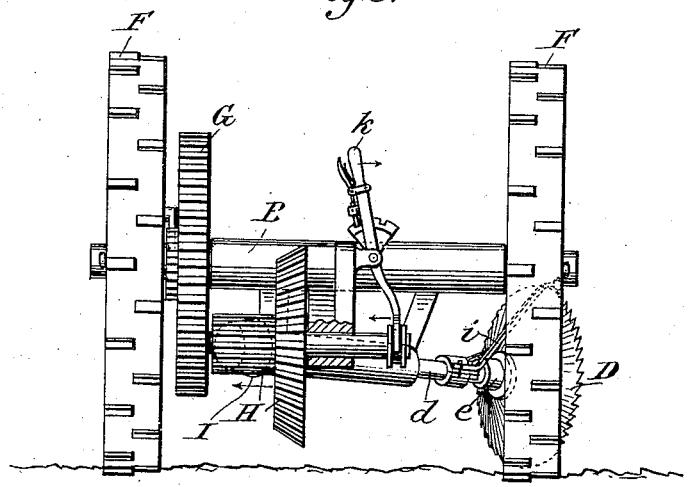
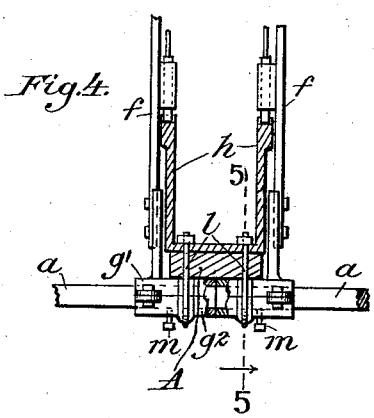
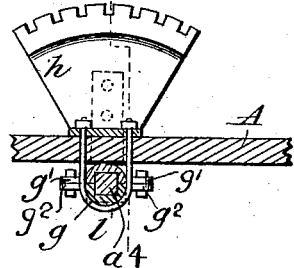
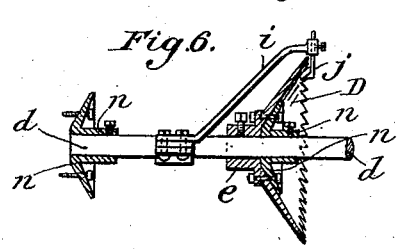
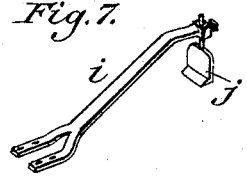
Witnesses:
Inventor:
Joseph Gustave Rountree.

UNITED STATES PATENT OFFICE.

JOSEPH GUSTAVE ROUNTREE, OF BEEVILLE, TEXAS.

ROOT-CUTTING ATTACHMENT FOR PLOWING-MACHINES.

No. 915,483.  Specification of Letters Patent.  Patented March 16, 1909.

Application filed August 27, 1907. Serial No. 390,363.

*To all whom it may concern:*

Be it known that I, JOSEPH GUSTAVE ROUNTREE, a citizen of the United States, residing at Beeville, in the county of Bee and State of Texas, have invented certain new and useful Improvements in Root-Cutting Attachments for Plowing-Machines; and I do hereby declare the following to be a full, clear, and exact description of the invention, such as will enable others skilled in the art to which it appertains to make and use the same.

The present invention has reference generally to plowing machines, and it resides in the provision of a machine of that type having attached thereto an exceedingly simple, durable and efficient mechanism for cutting roots, said mechanism including a concave disk saw, or a series of such saws, as preferred.

More especially, however, the invention resides in the particular construction of the saw or saws; in the particular manner in which the same are driven; in the provision, in connection with each saw, of a scraping device; and in the specific form of such scrapers.

These and other features, which comprise the subject of the present case will be readily understood from a consideration of the following detailed description, and their preferred embodiment is illustrated in the accompanying drawings, in which corresponding parts are designated by similar reference characters in the several views.

Figure 2:
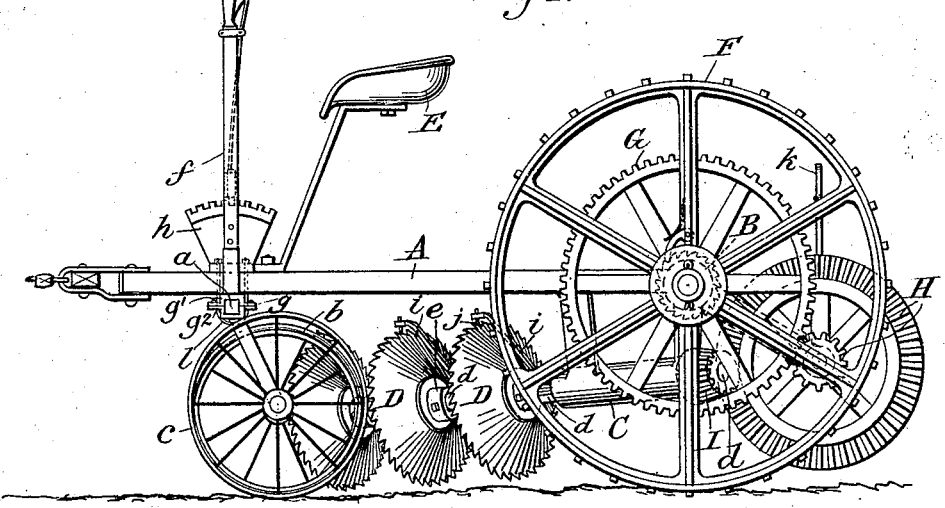

Of the said drawings: Figure 1 is a plan view of the invention. Fig. 2 is a side elevation thereof. Fig. 3 is an end elevation. Fig. 4 is a vertical section on the line 4—4 of Fig. 5. Fig. 5 is a similar section on the line 5—5 of Fig. 4. Fig. 6 is a vertical section through one of the saws, illustrating the manner in which the same is attached to the saw shaft, the figure showing additionally one of the sleeved concave plates to which the saws are secured. Fig. 7 is a perspective view of one of the scrapers and the arm which carries the same.

Referring more particularly to the drawings A designates the main longitudinal beam of the machine; B a transverse bearing sleeve which is formed integral with said beam toward its rear end and extends on opposite sides thereof, said sleeve being adapted to support the rear axle which projects therethrough, the axle carrying the spurred ground wheels F; and C a second bearing sleeve which is connected by ribs with the beam A and sleeve B and supports the saw shaft $d$, whose rear portion extends therethrough.

The beam A carries toward its forward end a two-part cylindrical bearing $g$ for the two-part squared front axle $a$, the opposite ends of which are provided with L-shaped extensions formed integral therewith, the right-hand extension carrying an outwardly inclined furrow-opening wheel $b$ having a tire provided with a beveled or sharpened edge secured to its rim, while the left-hand extension carries a ground wheel $c$, said wheels being loosely mounted upon said extensions, as will be understood. Each part or member of the bearing above referred to comprises upper and lower sections $g^1$ and $g^2$, bolted or riveted together, said sections having mating rectangular seats formed in their inner faces for the reception of the inner ends of the two members of the squared axle $a$, which latter fits snugly therein, movement of the bearing upon the axle being prevented by means of screws $m$, whose stems extend through openings formed in the lower sections $g^2$ and impinge against the axle. Each upper section $g^1$ has formed upon its outer face a pair of vertical projections, and each projection has a lever $f$ rigidly secured thereto, said levers being disposed within easy reach of the occupant of a seat E, whose supporting rod is secured to the beam A. Each lever is provided, in turn, with a spring-pressed dog adapted for engagement with a vertical segmental rack $h$, the two racks and the connecting strap between the same forming an integral structure, as shown in Fig. 4. The above mentioned connecting strap is fastened to the beam A by a pair of U-shaped clips $l$, which straddle the bearing $g$. This construction as will be apparent, permits the bearing $g$, and with it the front axle, to be rocked in one direction or the other, thus swinging the beam A and the saw-shaft $d$ and its sleeve C toward or from the ground, an independent adjustment of the wheels $b$ and $c$ being likewise possible, owing to the two-part formation of the bearing and of the axle.

The rear end of the saw-shaft projects slightly beyond the corresponding end of the sleeve C and carries at such point a pinion I which meshes with the pinion member of a combined gear and pinion H mounted upon the outer end of a shaft journaled in a horizontal bearing opening formed through the rear end of the beam A, said shaft being provided at its inner end with a flanged collar which is straddled by the bifurcated lower end of a lever k pivoted to an upstanding bracket formed upon said beam. Movement of said lever in one direction or the other will thus effect a longitudinal movement of said shaft, throwing the pinion member of the combined gear and pinion H into and out of mesh with the pinion I. The gear member of the combined gear and pinion meshes with a larger gear G carried by the rear axle, the longitudinal movement of the shaft upon which the compound gear is mounted effecting no disengagement of said gear member from the gear G as the width of said member is sufficiently great to permit its teeth to mesh with those of the gear G at all times.

The saw-shaft is provided with a series of concavo-convex saw disks D, each of which is secured to the shaft by a dished or cup-shaped plate n, and a flanged collar e, which fit, respectively, against the concave front and convex rear faces of the disk and are connected with the latter by bolts, as shown in Fig. 6. The saws are held in position upon the saw-shaft by means of threaded bolts which pass through openings formed through the collars e and through the integral bearing sleeves with which the plates n are provided.

Each saw has disposed against its concave face, the flanged lower end of a scraper plate j, whose reduced stem projects through an opening formed in the front end of an upwardly and forwardly projecting arm i, said stem being engaged by the inner end of a screw, to effect the retention of the scraper in adjusted position. The rear end of each arm i includes a pair of diverging feet which are secured to the upper member of a pair of plates disposed upon opposite sides of the axle and bolted together at their side edges.

The sleeve C which carries the saw-shaft a, is disposed beneath the beam A and at an angle thereto, said shaft extending forwardly and outwardly from the beam, as shown. The beam carries at its front end a clevis to which the usual doubletree is pivoted.

During the travel of the machine, it will be apparent that the rotation of the saw-shaft can be readily started and terminated by moving the pinion member of the compound gear H into and out of mesh with the pinion I, such movement being effected by the lever k, it being also possible to raise or lower the saw-shaft from or toward the ground by the levers f. Further description of the operation of the machine is deemed unnecessary, in view of the foregoing.

What is claimed is:—

1. In a machine of the class described, the combination, of an axle, and traction wheels carried thereby; a beam provided adjacent its rear end with a transversely arranged bearing sleeve adapted to receive the axle; a sleeve disposed beneath said beam and connected therewith and with the first-mentioned sleeve; a shaft carried by the last-mentioned sleeve and provided with a disk saw; driving connections between said shaft and the axle; and means for swinging said beam upon the axle, to raise or lower said shaft.

2. In a machine of the class described, the combination of an axle and traction wheels carried thereby; a longitudinal beam connected with the axle; a sleeve secured to said beam; a shaft carried by said sleeve and provided with a disk saw; a transverse shaft carried by said beam at its rear end; means for rotating said transverse shaft; intermeshing gears carried by said shafts; and means for imparting an endwise movement to said transverse shaft, for throwing its gear into and out of mesh with the gear upon said first-mentioned shaft.

3. In a machine of the class described, the combination of an axle and traction wheels carried thereby; a longitudinal beam connected with the axle and provided at its rear end with a transverse opening; a shaft movable through said opening; means for rotating said shaft; a sleeve secured to said beam and set at an angle thereto; a shaft carried by said sleeve and provided with a disk saw; intermeshing gears carried by said shafts; and a lever pivoted to said beam and connected with the first-mentioned shaft, for effecting the movement thereof, to throw the gear carried by said shaft into and out of mesh with the gear upon the last-mentioned shaft.

4. In a machine of the class described, the combination of an axle and traction wheels carried thereby; a longitudinal beam pivoted to the axle; a sleeve carried by the beam and secured at an angle thereto; a shaft carried by said sleeve; a concavo-convex disk saw mounted upon said shaft; a dished plate and a collar disposed against the opposite faces of the saw and secured thereto and to said shaft; and driving connections between said shaft and the axle.

5. In a machine of the class described, in combination, a two-part front axle having its ends cranked; a rear axle; wheels mounted upon the ends of said axle; a longitudinal beam pivotally connected with the rear axle; a sleeve disposed beneath said beam and connected thereto; a shaft carried by said sleeve and provided with a disk-saw; means for rotating said shaft; a two-part bearing sleeve carried by the front axle, each member of said bearing being secured to the adjacent member of the front axle and connected rotatably with said beam; and a lever carried by each member of said bearing, for rocking the same and that member of the axle to which it is secured.

6. In a machine of the class described, in combination, a squared two-part front axle having its ends cranked; a rear axle; wheels mounted upon the ends of said axles; a longitudinal beam pivotally connected with the rear axle; a shaft carried by said beam and provided with a disk-saw; means for rotating said shaft; a two-part bearing sleeve secured to the front axle, each member of said bearing comprising upper and lower connected sections provided with mating rectangular seats; clips connecting said bearing and beam; a laterally-extending projection formed upon each member of the upper section of the bearing; and a lever rigidly secured to each projection, for rocking the corresponding bearing member and that member of the front axle to which it is secured.

JOSEPH GUSTAVE ROUNTREE.

Witnesses:
  M. W. BATES,
  J. F. BURKE.